United States Patent
Cutler et al.

(10) Patent No.: US 11,550,318 B2
(45) Date of Patent: Jan. 10, 2023

(54) VARIABLE SENSITIVITY INPUT DEVICE FOR VEHICLE

(71) Applicant: Kitty Hawk Corporation, Palo Alto, CA (US)

(72) Inventors: Mark Johnson Cutler, Sunnyvale, CA (US); Alexander David Selwa, San Francisco, CA (US); Todd Reichert, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 120 days.

(21) Appl. No.: 17/208,993

(22) Filed: Mar. 22, 2021

(65) Prior Publication Data

US 2021/0208585 A1    Jul. 8, 2021

Related U.S. Application Data (63) Continuation of application No. 16/710,401, filed on Dec. 11, 2019, now Pat. No. 10,983,518, which is a continuation of application No. 16/182,463, filed on Nov. 6, 2018, now Pat. No. 10,551,837.

(51) Int. Cl.
| | |
|---|---|
| *G05D 1/00* | (2006.01) |
| *B64C 13/18* | (2006.01) |
| *B64C 13/04* | (2006.01) |
| *G05D 1/04* | (2006.01) |
| *G08G 5/00* | (2006.01) |

(52) U.S. Cl.
CPC .......... *G05D 1/0061* (2013.01); *B64C 13/042* (2018.01); *B64C 13/18* (2013.01); *G05D 1/042* (2013.01); *G08G 5/006* (2013.01)

(58) Field of Classification Search
CPC .... G05D 1/0061; G05D 1/042; B64C 13/042; B64C 13/18; B64C 13/0421; B64C 13/16; B64C 27/20; G08G 5/006
See application file for complete search history.

(56) References Cited

U.S. PATENT DOCUMENTS

| | | | |
|---|---|---|---|
| 6,641,087 B1 | 11/2003 | Nelson | |
| 7,006,904 B2 | 2/2006 | Pippenger | |
| 10,037,706 B1 | 7/2018 | Cutler | |
| 10,147,329 B2 | 12/2018 | Liu | |
| 10,175,697 B1 * | 1/2019 | Sachdeva | G06F 3/04845 |
| 10,551,837 B1 | 2/2020 | Cutler | |
| 2005/0187677 A1 | 8/2005 | Walker | |
| 2016/0163203 A1 | 6/2016 | Wang | |
| 2016/0272306 A1 | 9/2016 | Roberts | |
| 2018/0004207 A1 | 1/2018 | Michini | |

\* cited by examiner

*Primary Examiner* — Ian Jen
(74) *Attorney, Agent, or Firm* — Van Pelt, Yi & James LLP (57) ABSTRACT

A first sensitivity level is used to interpret an input signal received from an input device in a vehicle while the vehicle is in a first region. A second sensitivity level is used to interpret the input signal received from the input device in the vehicle while the vehicle is in a second region, wherein the second sensitivity level is greater than the first sensitivity level.

17 Claims, 10 Drawing Sheets

VARIABLE SENSITIVITY INPUT DEVICE FOR VEHICLE

CROSS REFERENCE TO OTHER APPLICATIONS

This application is a continuation of U.S. patent application Ser. No. 16/710,401, entitled VARIABLE SENSITIVITY INPUT DEVICE FOR VEHICLE filed Dec. 11, 2019, which is a continuation of U.S. patent application Ser. No. 16/182,463, now U.S. Pat. No. 10,551,837, entitled VARIABLE SENSITIVITY INPUT DEVICE FOR VEHICLE filed Nov. 6, 2018, each of which is incorporated herein by reference for all purposes.

BACKGROUND OF THE INVENTION

New types of vehicles are being developed for inexperienced users with minimal training and/or experience (e.g., the users are not required to obtain a license, they are not expected to undergo weeks or even days of training, etc.). In some cases, the vehicles are single-seat vehicles so that an instructor cannot accompany the user and intervene if needed. Given the inexperience of such users, new techniques to improve safety for the users and/or people in the vicinity of the vehicle would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

New types of aircraft are being developed for use by inexperienced pilots. Takeoffs and landings are the most difficult and dangerous part of flying and new techniques which can be deployed during takeoffs and landings (and/or at other times) to assist with safety while still supporting a fun and enjoyable flight experience are described herein. In some embodiments, this is done by using a first sensitivity level to interpret an input signal received from an input device in a vehicle while the vehicle is in a first region and using a second sensitivity level to interpret the input signal received from the input device in the vehicle while the vehicle is in a second region, wherein the second sensitivity level is greater than the first sensitivity level. For example, the vehicle may be an aircraft where the first region is at or near the landing zone where the aircraft is less sensitive to the input signal from the input device (e.g., a joystick) so that the aircraft responds or flies at slower speeds when at or near the landing zone.

Figure 1:
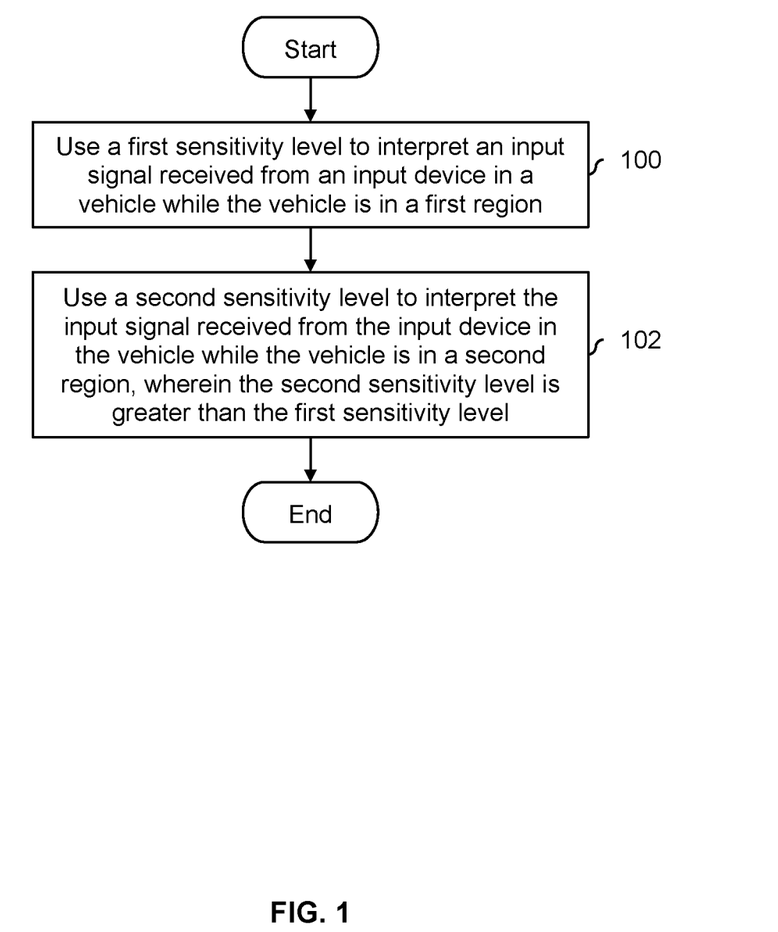
FIG. 1 is a flowchart illustrating an embodiment of a process to use different sensitivity levels to interpret an input signal received from an input device in a vehicle.

FIG. 1 is a flowchart illustrating an embodiment of a process to use different sensitivity levels to interpret an input signal received from an input device in a vehicle. In some embodiments, the vehicle is an aircraft and the process is performed by a flight controller or flight computer (e.g., embodiment in a processor and a memory coupled with the processor which provides the processor with instructions).

At 100, a first sensitivity level is used to interpret an input signal received from an input device in a vehicle while the vehicle is in a first region. For example, suppose the vehicle is an aircraft and the input device is a joystick. The aircraft's landing zone (and possibly some region around the landing zone) is included in the first region. In this example, the first sensitivity level is relatively small and causes a flight computer to interpret the pilot's inputs via the joystick as relatively slow velocities while the aircraft is over and/or near the landing zone. For example, if the pilot pushes the joystick forward all the way (i.e., the joystick is at full displacement from center) while the aircraft is at or near the landing zone, this would be interpreted as a relatively slow (e.g., maximum) velocity. In one example, this first (e.g., relatively small) sensitivity level goes from 0 m/s (e.g., the joystick is a spring-centered joystick and is in a centered position) to 1 m/s (e.g., the joystick is at full displacement from center).

Being less sensitive to the input signal from an input device while an aircraft is at or near a landing zone (per the example described above) may be desirable because it makes it easier for a pilot to land the aircraft in a relatively small area, especially if that pilot is inexperienced. For example, some types of single-seat aircraft are being developed where the pilots are not required to have undergone significant training and/or certification (e.g., training may be only a few minutes long). It is assumed that some pilots will be inexperienced with flying in general. With the single-seat configuration, an instructor cannot ride along and intervene if needed. Landing an aircraft on a platform over water or within some boundary may require more precision and/or skill than (as an example) flying in the open skies with no other objects or obstacles in the air. By using less sensitivity to interpret the input signal from the input device during landing (i.e., at or near the landing zone), this may prevent the pilot from missing or overshooting the landing zone because the aircraft is constrained to fly at slower speeds (e.g., less sensitive means a same amount of joystick displacement results in less of an increase in speed).

In some applications, a landing zone is shared by multiple aircraft and so there may be other aircraft in the vicinity of the landing zone. Going slower at or near the landing zone may also be safer because in the event of a crash, slower collisions tend to be safer for the pilot and/or other people (e.g., the other pilot, people on the ground, etc.).

Another benefit in being less sensitive to the joystick or other input device is that it may prevent and/or mitigate pilot induced oscillations (e.g., where an inexperienced pilot goes too far in one manner or aspect, overcorrects, goes too far in the other direction, overcorrects, etc.) which are more likely to occur during a takeoff or landing than when the pilot is flying around in a more unconstrained manner or area.

At 102, a second sensitivity level is used to interpret the input signal received from the input device in the vehicle while the vehicle is in a second region, wherein the second sensitivity level is greater than the first sensitivity level. To continue the example from above, suppose that the second region is relatively far away from the landing zone with few or no obstacles. The exemplary aircraft described above is designed to fly over water (e.g., it has pontoons or floats which provide buoyancy so that the aircraft can land on water if desired). In one example application, the landing zone is near the shoreline. Once the aircraft has taken off and flies towards open water, there may be relatively few obstacles to worry about. As such, it may be sufficiently safe (and fun, from the pilot's perspective) to be more sensitive when interpreting the joystick's inputs when the pilot is flying over open water. To put it another way, it may be sufficiently safe when the aircraft is away from the landing zone to permit the pilot to fly the aircraft at faster (e.g., maximum) velocities. To that end, a more sensitive interpretation of the input signal from the input device in this region (e.g., away from the landing zone) is used. For example, the permitted velocity may range from 0 m/s (e.g., when the spring-centered joystick is centered) to 5 m/s (e.g., when the joystick is at full displacement from center) when the aircraft is away from the landing zone. In contrast, when the aircraft is at or near the landing zone, the same amount of joystick displacement would be interpreted on a less sensitive scale so that a slower speed results.

Although some examples described herein use a landing zone to describe or otherwise define a first region and a second region, in some embodiments, the regions are defined differently and/or for other purposes. For example, areas with more congestion and/or obstacles may be defined as a region where a less sensitive interpretation or response is used; areas with more congestion and/or obstacles may be defined as a region where a more sensitive interpretation or response is used.

Similarly, although some examples described herein use joysticks as an example of an input device, any type of input device may be used including sliders, dials/knobs, increase/decrease buttons, etc.

In various embodiments, the decision about when to switch between a first region and a first sensitivity level at step 100 and a second region and a second sensitivity level at step 102 is performed per a variety of techniques. The following figure describes two examples. In the first example, a base station is used to initiate the change. In the second example, the aircraft automatically decides when to make the change.

Figure 2:
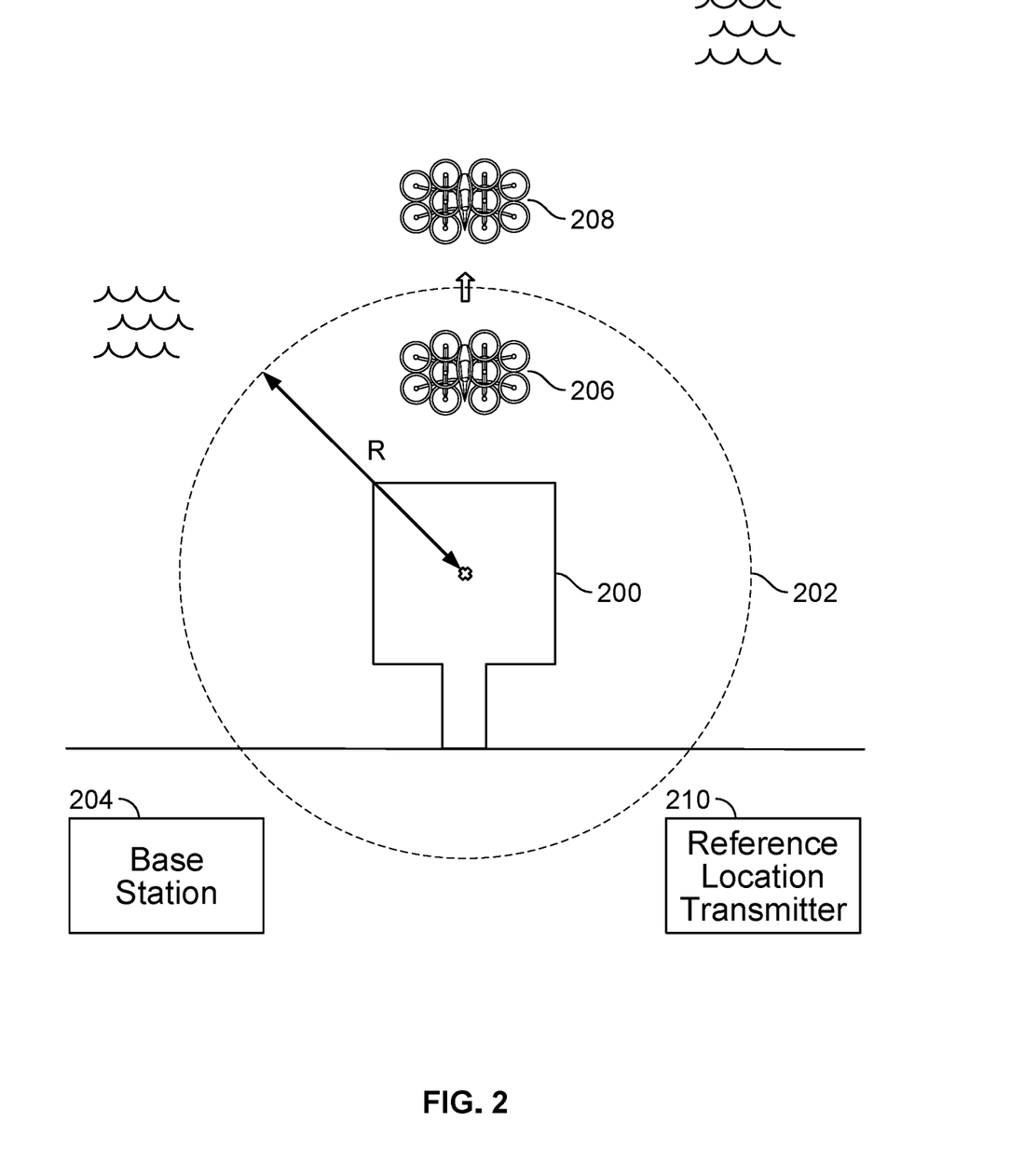
FIG. 2 is a diagram illustrating an embodiment of an overwater landing zone at the end of a pier.

FIG. 2 is a diagram illustrating an embodiment of an overwater landing zone at the end of a pier. In the example shown, a multicopter takes off from and lands on a landing zone (200) that is located over water at the end of a pier. The landing zone (200) is located at the center of an imaginary circle (202) with a radius of R. As described above, it may be safer to limit the speed of aircraft at or near the landing zone, but it may be more enjoyable if the pilot can fly at faster speeds when over open water with few or no obstacles. For this reason, inside of the circle (202) is one example of a first region where a first sensitivity level is used (e.g., less sensitive) and outside of the circle (202) is one example of a second region where a second sensitivity level is used (e.g., more sensitive) to interpret the input signal from the input device.

In some embodiments, base station 204 is used to switch between the two regions and sensitivity levels. For example, suppose the aircraft is on landing zone (200) waiting to take off. The flight begins with the flight computer interpreting the input signal from the joystick or other input device in a less sensitive manner (e.g., so the aircraft is only permitted to fly between 0 m/s and 1 m/s at or near the landing zone). A person (e.g., some supervisor or monitor) watches the aircraft take off from the landing zone. Once the aircraft is sufficiently far from the landing zone (e.g., outside of circle 202, as multicopter 208 is), the controller or supervisor at the base station (204) causes the base station to send a signal to the aircraft. In response to receiving the signal, the aircraft will (e.g., gradually) switch from the first sensitivity level (see, e.g., step 100 in FIG. 1) to the second sensitivity level (see e.g., step 102 in FIG. 1). In other words, the pilot can fly at faster speeds once permission has been granted from a supervisor or controller via the base station (204).

When it is time to land the aircraft (not shown), the reverse happens. The pilot will fly the aircraft towards the landing zone. When the aircraft gets close to the landing zone (e.g., when entering circle 202), the supervisor at the base station will cause a signal to be sent from the base station (204) to the incoming aircraft which causes the flight computer to switch from the more sensitive interpretation of or response to the joystick to the less sensitive interpretation of or response to the joystick. This will force the aircraft to fly at slower speeds inside of circle 202 (i.e., at or near the landing zone).

In some applications, using a base station to switch between the two regions and sensitivities is attractive because it is relatively easy to implement. For example, this may be how the first version of this feature is rolled out. In some applications, someone is/was already onsite for other reasons (e.g., to greet people, to explain rules, to perform maintenance/servicing, for security, etc.) and so this control paradigm dovetails neatly with existing staffing support.

The following figure shows exemplary state transitions associated with takeoff and landing using this technique.

Figure 3A:
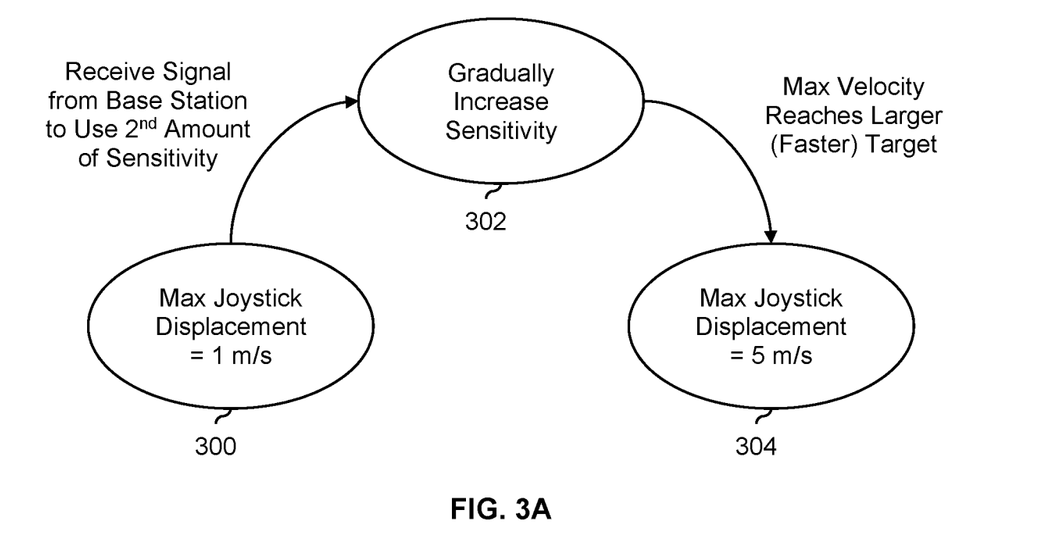
FIG. 3A is a diagram illustrating an embodiment of states associated with takeoff where a signal from a base station initiates a change from a first, smaller sensitivity level to a second, larger sensitivity level.

FIG. 3A is a diagram illustrating an embodiment of states associated with takeoff where a signal from a base station initiates a change from a first, smaller sensitivity level to a second, larger sensitivity level. In the example shown, an aircraft is taking off and starts in state 300 where the maximum joystick displacement (e.g., from center) is associated with a maximum velocity of 1 m/s (which in this example is a relatively slow maximum velocity).

The aircraft stays in state 300 (i.e., where the system is less sensitive to the joystick or other input device) until a signal is received from a base station to be more sensitive to the joystick. In response, the aircraft switches from state 300 to state 302 where the sensitivity level is gradually increased. Another way to describe state 302 is to say that the maximum velocity associated with the maximum joystick displacement (e.g., previously 1 m/s) is gradually increased (e.g., to 5 m/s).

In this example, there is a gradual change between the less sensitive state (e.g., associated with state 300) and the more sensitive state (e.g., associated with state 304). This is to ensure a smooth transition and/or pleasant flight experience. For example, suppose that the pilot had the joystick pushed all the way forward after takeoff. If the flight computer were to suddenly switch from the less sensitive response to the joystick's inputs to the more sensitive response, then the flight computer would suddenly observe a jump in the input signal from a desired speed of 1 m/s to 5 m/s. To avoid a sudden acceleration or deceleration, a gradual transition is used in this example.

Once the maximum velocity has reached the larger (i.e., faster) target (in this example, 5 m/s), the flight computer switches to state 304 where the system is more sensitive to the joystick's inputs. In this state, the maximum joystick displacement corresponds to a maximum velocity of 5 m/s.

Figure 3B:
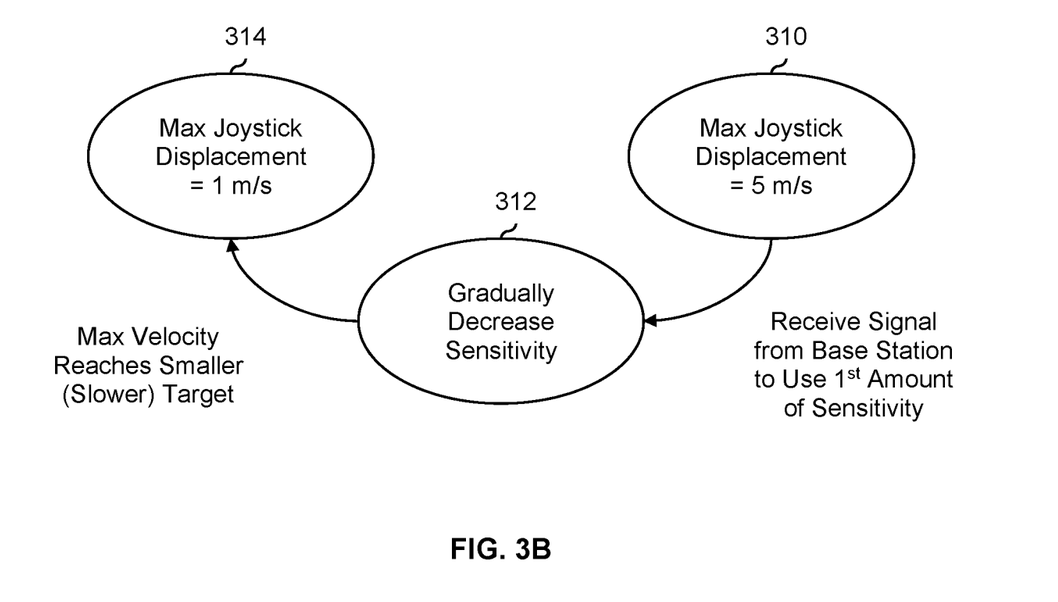
FIG. 3B is a diagram illustrating an embodiment of states associated with landing where a signal from a base station initiates a change from a second, larger sensitivity level to a first, smaller sensitivity level.

FIG. 3B is a diagram illustrating an embodiment of states associated with landing where a signal from a base station initiates a change from a second, larger sensitivity level to a first, smaller sensitivity level. In this example, an aircraft has been flying (e.g., over open water) with a more sensitive response to the joystick (e.g., which permits or otherwise enables faster maximum velocities) but now the pilot is ready to land.

The aircraft starts in state 310 in a more sensitive state where the maximum joystick displacement corresponds to a maximum velocity of 5 m/s. As the aircraft approaches the landing zone to land, the person at the base station sees the aircraft coming in to land. When the aircraft gets close to the landing zone, the supervisor causes a signal (to be less sensitive to the joystick's inputs) to be sent from the base station to the aircraft. In response to the signal, the aircraft goes to state 312, where the sensitivity (e.g., to the joystick or other input device) is gradually decreased. To put it another way, the maximum velocity associated with the maximum joystick displacement is gradually decreased from 5 m/s to 1 m/s (at least in this example).

Once the maximum velocity reaches the smaller (i.e., slower target), the aircraft enters state 314 which is associated with a less sensitive response to the joystick where the maximum joystick displacement corresponds to a maximum velocity of 1 m/s (i.e., the smaller dynamic range is used).

The following figure describes this process more formally and/or generally in a flowchart.

Figure 4:
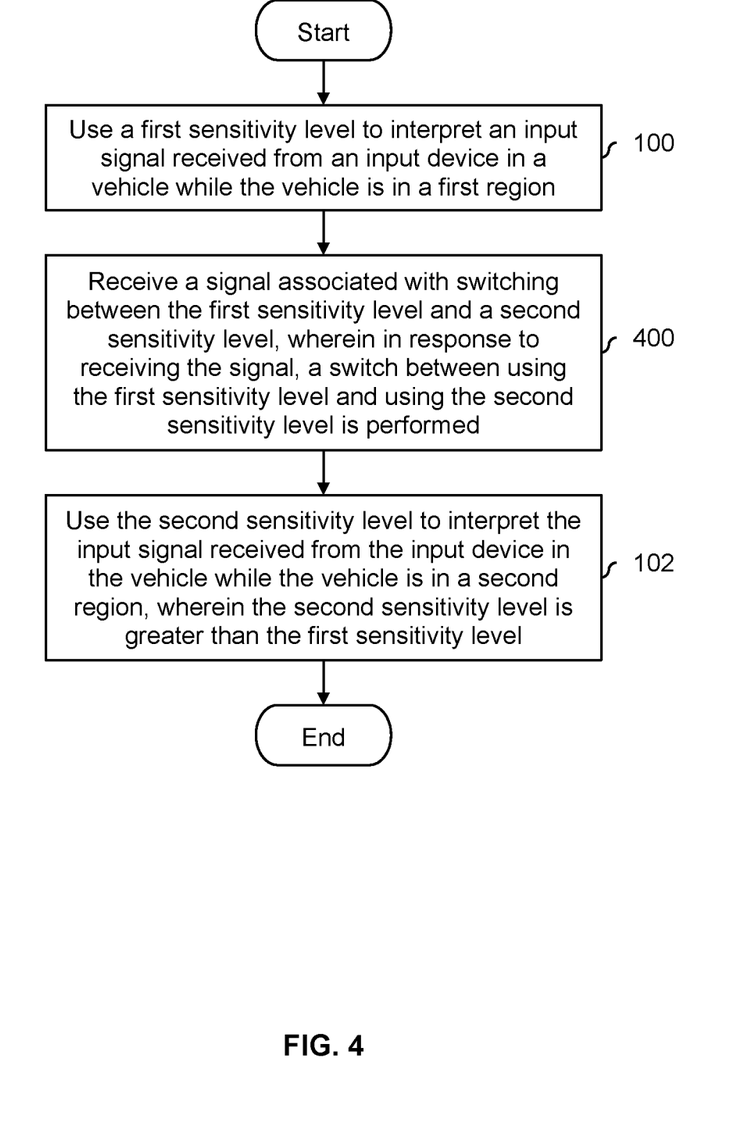
FIG. 4 is a flowchart illustrating an embodiment of a process to use different sensitivity levels to interpret an input signal received from an input device in a vehicle where a switch is performed in response to a signal.

FIG. 4 is a flowchart illustrating an embodiment of a process to use different sensitivity levels to interpret an input signal received from an input device in a vehicle where a switch is performed in response to a signal. FIG. 4 is related to FIG. 1 and the same or similar reference numbers are used to indicate the related steps.

At 100, a first sensitivity level is used to interpret an input signal received from an input device in a vehicle while the vehicle is in a first region. For example, in FIG. 2, a less sensitive interpretation of or response to a joystick or other input device's input signal is used when an aircraft is near landing zone 200. In FIG. 3A this corresponds to state 300 (e.g., at takeoff when the aircraft is on or near the landing zone) and in FIG. 3B this corresponds to state 314 (e.g., during landing when the aircraft is on or near the landing zone).

At 400, a signal associated with switching between the first sensitivity level and a second sensitivity level is received, wherein in response to receiving the signal, a switch between using the first sensitivity level and using the second sensitivity level is performed. For example, in FIG. 2, the signal is sent via the base station (204) when a supervisor or controller on shore observes an aircraft entering or leaving circle 202. It is noted that this signal may be associated with or otherwise trigger switching from the first sensitivity level to the second sensitivity level as shown in FIG. 3A or vice versa as shown in FIG. 3B.

At 102, a second sensitivity level is used to interpret the input signal received from the input device in the vehicle while the vehicle is in a second region, wherein the second sensitivity level is greater than the first sensitivity level. See, for example, state 304 in FIG. 3A and state 310 in FIG. 3B. In FIG. 2, this corresponds to the region outside of circle 202.

Returning to FIG. 2, in some embodiments, automatic switching between different sensitivity levels to an input device based on region or location is performed. Generally speaking, with this technique (which may be implemented in a variety of ways), the aircraft continually checks or otherwise decides if it is in the first region or the second region and changes its sensitivity level to the input device accordingly. This may be implemented using a variety of techniques, including geofencing.

For simplicity and ease of explanation, in one example, reference location transmitter (210) transmits the (e.g., GPS) location of a reference location, which in this example is the location of the landing zone (200). An aircraft will periodically check its (e.g., GPS) location and calculate the distance between itself and the reference location. If the distance is greater than R, then the flight computer will decide that it is in the second region (i.e., outside of circle 202) and use the second sensitivity level to interpret input signals from the joystick or other input device. For example, aircraft 208 would make this decision. If the distance calculated is R or less, then the flight computer decides that it is in the first region (i.e., inside of circle 202) and the first sensitivity level will be used to interpret or otherwise respond to input signals from the input device. For example, aircraft 206 would make this decision. As described above, it may be desirable to gradually make the switch between the different sensitivity levels. The following figures show an example of this.

Figure 5A:
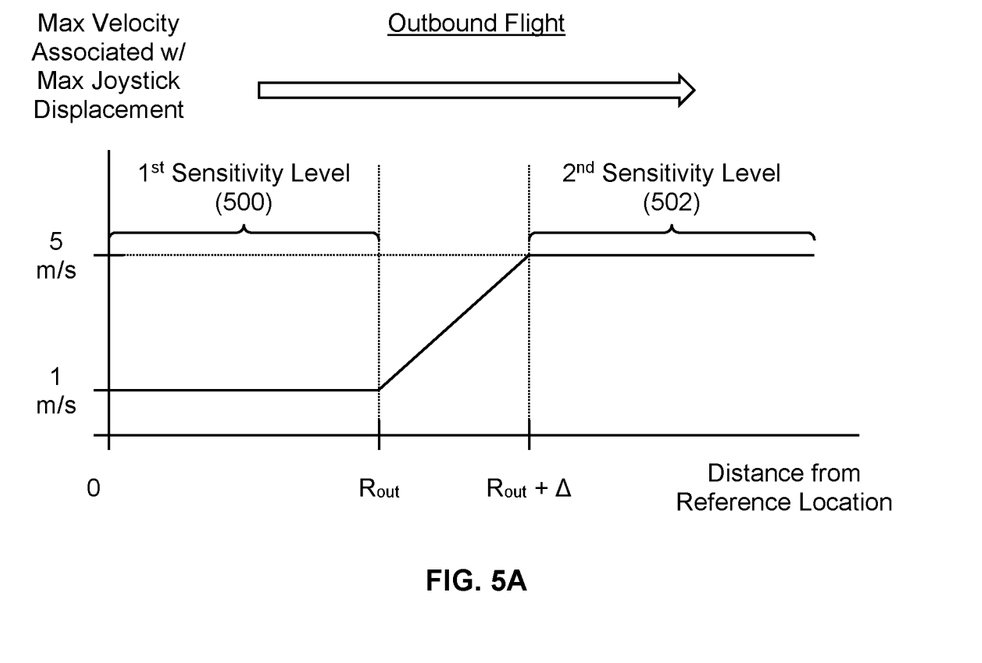
FIG. 5A is a diagram illustrating an embodiment of a maximum velocity associated with a vehicle as that vehicle takes off and moves away from a reference location.

FIG. 5A is a diagram illustrating an embodiment of a maximum velocity associated with a vehicle as that vehicle takes off and moves away from a reference location. In this example, the x-axis is the distance from a reference location (e.g., landing zone 200 in FIG. 2) and the y-axis is the maximum velocity associated with a maximum joystick displacement. For simplicity and ease of explanation, in this example it is assumed that the aircraft takes off and keeps moving away from the landing zone (i.e., without circling back).

When the aircraft is on or at the landing zone (i.e., distance from reference location=0), the maximum velocity is 1 m/s in this example. This corresponds to using the first sensitivity level. As the aircraft flies away from the reference location, it periodically calculates the distance between itself and the reference location (in this example, the landing zone) and compares it to a threshold (in this example, $R_{out}$). While the distance is less than $R_{out}$, the first sensitivity level is used (500).

Once the aircraft is a distance of $R_{out}$ from the reference location, the flight computer on the aircraft gradually increases the sensitivity level. In this example that corresponds to increasing the maximum velocity associated with a maximum joystick displacement from 1 m/s to 5 m/s. When the maximum velocity reaches 5 m/s, the maximum velocity levels off even as the distance from the reference location increases. From this point onwards (502), the second sensitivity level is used which permits the aircraft to fly faster.

Figure 5B:
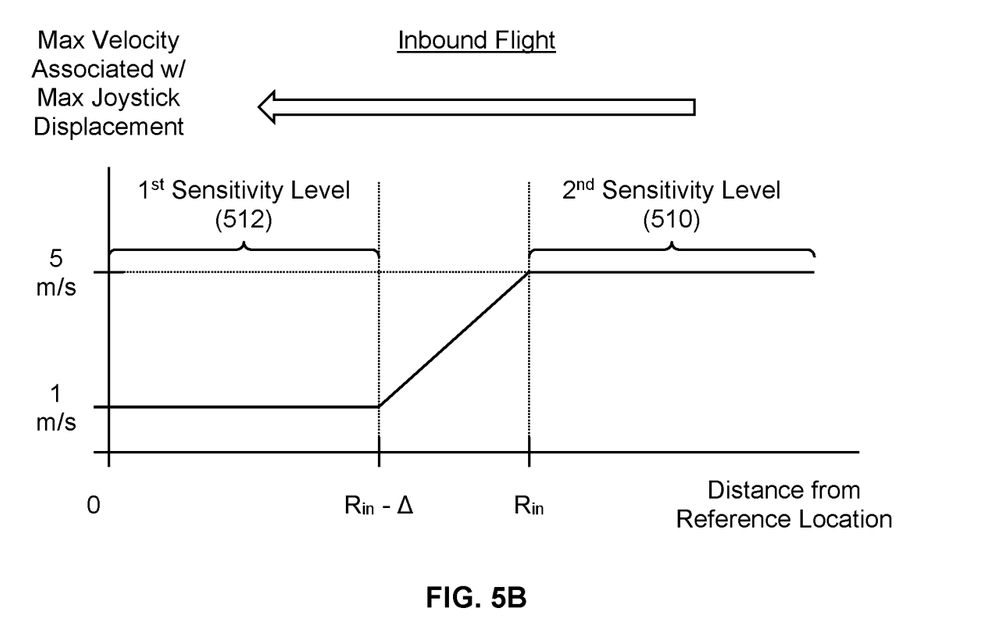
FIG. 5B is a diagram illustrating an embodiment of a maximum velocity associated with a vehicle as that vehicle moves towards a reference location for a landing.

FIG. 5B is a diagram illustrating an embodiment of a maximum velocity associated with a vehicle as that vehicle moves towards a reference location for a landing. In this example, the aircraft is returning to the landing zone to land. At distances greater than $R_{in}$ from the landing zone (510), a second sensitivity level is used which corresponds to a maximum velocity of 5 m/s (associated with the maximum joystick displacement). At a distance of $R_{in}$ from the landing zone, the flight computer will begin to gradually decrease the sensitivity level used to interpret the input device. This corresponds to decreasing the maximum velocity (e.g., corresponding to a maximum joystick displacement) until a maximum velocity of 1 m/s is reached. Once a maximum velocity of 1 m/s is reached, the maximum velocity levels off. In this range (512) the first sensitivity level is used and the aircraft is forced to fly at slower speeds.

In various embodiments, $R_{it}$ and $R_{out}$ may be selected as desired. In some embodiments, $R_{in} > R_{out}$. In some embodiments, $R_{in}$ and $R_{out}$ are selected so that the range of 500 in FIG. 5A approximates the range of 512 in FIG. 5B and/or the range of 502 in FIG. 5A approximates the range of 510 in FIG. 5B.

The following figure describes this example more generally and/or formally in a flowchart.

Figure 6:
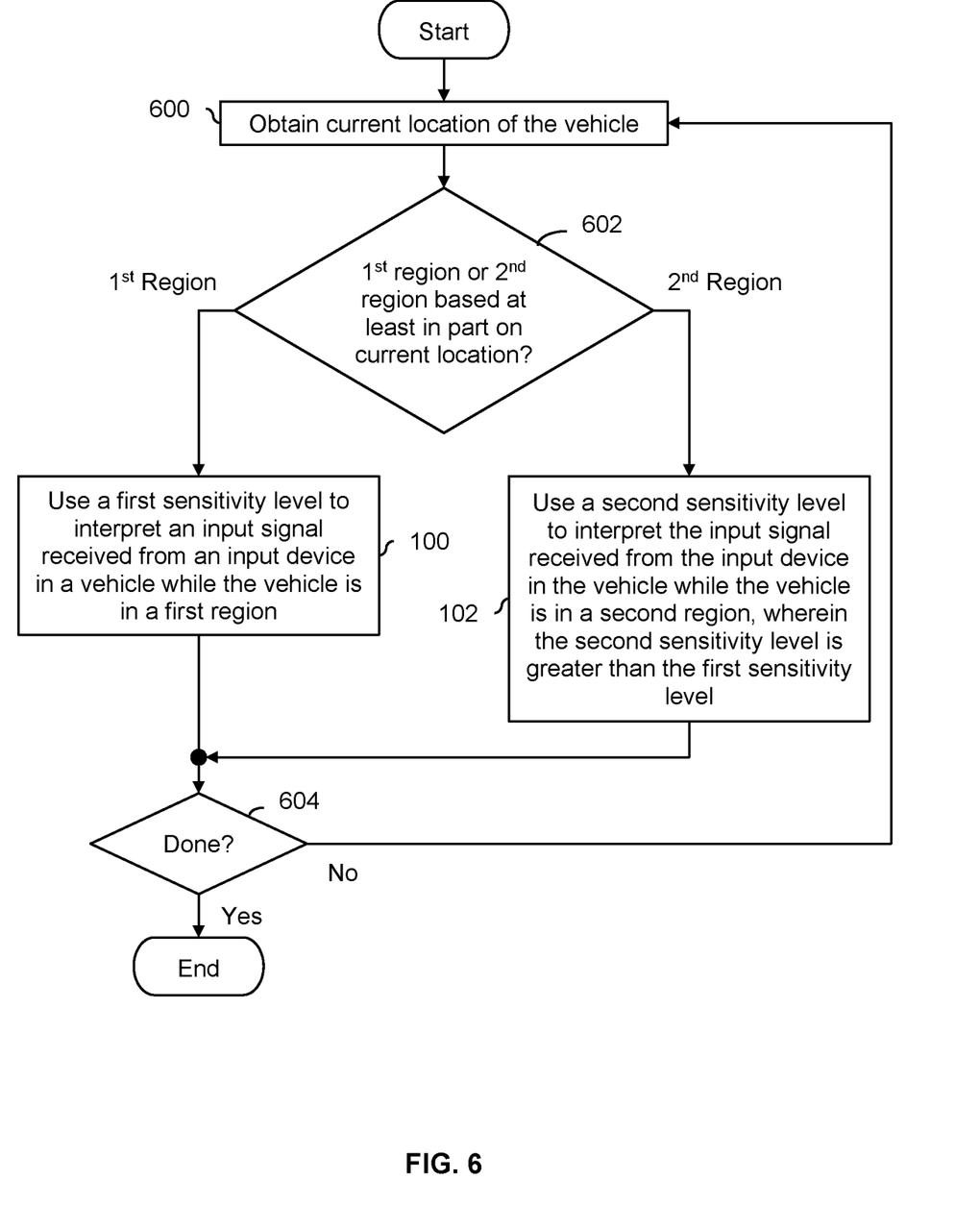
FIG. 6 is a flowchart illustrating an embodiment of a process to use different sensitivity levels for an input device where a switch is performed automatically.

FIG. 6 is a flowchart illustrating an embodiment of a process to use different sensitivity levels for an input device where a switch is performed automatically. FIG. 6 is related to FIG. 1 and the same or similar reference numbers are used to indicate the related steps.

At 600, a current location of the vehicle is obtained. For example, an aircraft may include a GPS transceiver and use the transceiver to obtain its location.

At 602, it is determined whether the vehicle is in a first region or a second region based at least in part on the current location of the vehicle. In FIG. 2, for example, the first region corresponds to inside circle 202 and the second region corresponds to outside of circle 202. The distance between the current location of the vehicle and the location of the landing zone (200), transmitted by the reference location transmitter (210), is calculated and compared against the distance R to make that determination in the example of FIG. 2. In some other embodiments, some other technique is used. For example, geofencing may be used where the boundary of the geofence is used to define or otherwise mark where the first region and the second region are.

In response to determining that the vehicle is in the first region at 602, a first sensitivity level is used to interpret an input signal received from an input device in a vehicle while the vehicle is in a first region at 100. For example, aircraft 206 in FIG. 2 would determine it is in the first region and as a result would use a first sensitivity level (e.g., less sensitive to inputs received via the input device).

In response to determining that the vehicle is in the second region at 602, a second sensitivity level is used to interpret the input signal received from the input device in the vehicle while the vehicle is in a second region, wherein the second sensitivity level is greater than the first sensitivity level at 102. See, for example, aircraft 208 in FIG. 2 which would use a second, more sensitive level to interpret an input signal received from an input device compared to aircraft 206. This greater level of sensitivity to the input signal from the input device would enable aircraft 208 (outside of circle 202 and further away from landing zone 200) to fly faster than aircraft 206 (which is inside of circle 202 and closer to landing zone 200).

After using the first sensitivity level at 100 or using the second sensitivity level at 102, it is determined at 604 if the process is done. For example, this process may end when the flight computer is turned off. If it is determined at 604 that the process is done, the process ends. Otherwise, the current location of the vehicle is obtained at step 600.

In some applications, automatically detecting or deciding when to switch between sensitivity levels is desirable because it does not require the presence of a supervisor or controller on the ground. It may also be safer because a human supervisor or monitor may "miss" an incoming aircraft and may forget to switch the aircraft from the first (e.g., smaller) sensitivity level to the second (e.g., greater) sensitivity level. In contrast, autonomous detection and switching more consistently enforces the location-dependent usage of different sensitivity levels for the aircraft (e.g., it is less likely to overlook an incoming aircraft). This makes the overall system safer for the pilot and people on the ground.

Returning briefly to FIG. 2, in some embodiments, to further enhance safety, an aircraft is flown autonomously (e.g., using some autonomous takeoff or autonomous landing process) when inside circle 202 (i.e., in the first region) by using a first sensitivity level where the input signal received from the input device is ignored. The following figure describes this example more generally and/or formally in a flowchart.

Figure 7:
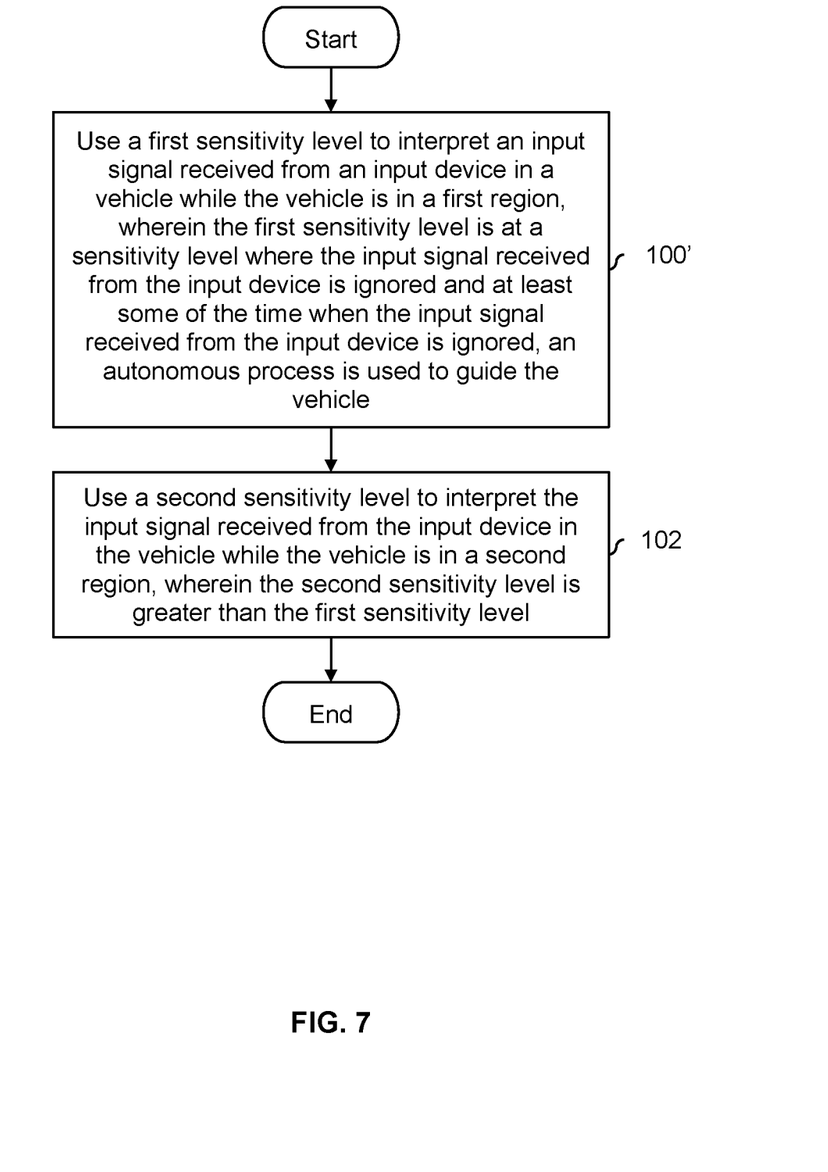
FIG. 7 is a flowchart illustrating an embodiment of a process to use different sensitivity levels to interpret an input signal received from an input device in a vehicle where the first sensitivity level is at a sensitivity level where the input signal received from the input device is ignored.

FIG. 7 is a flowchart illustrating an embodiment of a process to use different sensitivity levels to interpret an input signal received from an input device in a vehicle where the first sensitivity level is at a sensitivity level where the input signal received from the input device is ignored. FIG. 7 is related to FIG. 1 and the same or similar reference numbers are used to indicate the related steps.

At 100', a first sensitivity level is used to interpret an input signal received from an input device in a vehicle while the vehicle is in a first region, wherein the first sensitivity level is at a sensitivity level where the input signal received from the input device is ignored and at least some of the time when the input signal received from the input device is ignored, an autonomous process is used to guide the vehicle.

In FIG. 2, for example, the first region corresponds to (e.g., approximately) the area inside of circle 202. In this region, the first sensitivity level is used to interpret an input signal received from an input device and the first sensitivity level is (e.g., conceptually) "zeroed out" and/or completely insensitive to the input signal from the input device (e.g., a joystick). In other words, inside of circle 202, the input signal from the joystick or other input device is ignored of (e.g., the value or level of) the first sensitivity level. Instead of flying per the pilot's instructions via the joystick, an autonomous (flight) process (e.g., executed by the flight computer) is used to guide the vehicle. For example, during takeoff, an autonomous takeoff process may be used inside of circle 202 in FIG. 2. Or, during landing, an autonomous landing process may be used inside of circle 202 in FIG. 2.

At 102, a second sensitivity level is used to interpret the input signal received from the input device in the vehicle while the vehicle is in a second region, wherein the second sensitivity level is greater than the first sensitivity level.

For example, in the area outside of circle 202 in FIG. 2, with the second sensitivity level (e.g., which, unlike the first sensitivity level, is not "zeroed out"), the flight computer no longer ignores the input signal and the aircraft is sensitive or otherwise responsive to the input signal from the input device. To put it another way, the autonomous (flight) process is not used in the second region.

In some embodiments, the aircraft comes to a mid-air stop (e.g., the aircraft hovers mid-air) when switching between step 100' and step 102. For example, this may make the transition between an autonomous flight process (e.g., at step 100') and guided and/or directed flight (e.g., at step 102) smoother and/or safer.

In various embodiments, a switch between the first sensitivity level (e.g., at step 100') and the second sensitivity level (e.g., at step 102) may be initiated or otherwise performed in a variety of ways. For example, the processes of FIG. 4 and FIG. 7 may be combined where a signal (e.g., from a base station) causes a switch between step 100' where due to the first sensitivity level, the input signal is ignored and an autonomous (flight) process is used at least some of the time and step 102 where the second sensitivity level is used (e.g., where the input signal from the pilot received via a joystick or other input device is used to fly the aircraft). For brevity, that combination is not shown in its own figure herein.

Alternatively, in some embodiments, the switch between step 100' and step 102 may be detected or otherwise initiated automatically. For example, the processes of FIG. 6 and FIG. 7 may be combined where the aircraft automatically detects when it is in the first region versus the second region and correspondingly when to switch between step 100' and step 102. For brevity, that combination is not shown in its own figure herein.

The following figure describes an example multicopter which may perform the techniques described above.

Figure 8A:
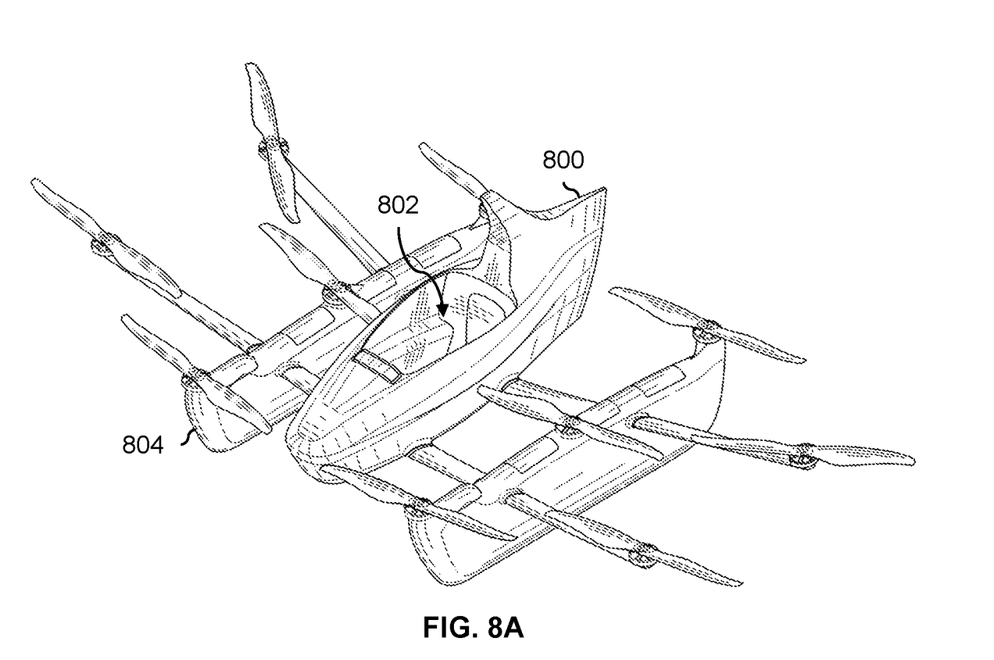
FIG. 8A is a diagram illustrating an embodiment of a single-seat multicopter.

FIG. 8A is a diagram illustrating an embodiment of a single-seat multicopter. Multicopter 800 is one example of an aircraft which can perform (e.g., if desired) the technique(s) described above. In this particular example, multicopter 800 has two floats or pontoons (804) (e.g., which provide buoyancy for water takeoffs and/or landings, if desired) and a single seat (802). With this single seat configuration, it is not possible for an instructor to accompany less experienced pilots and intervene during the flight as or if needed. As such, it may be desirable if multicopter 800 implemented one or more of the safety-enhancing techniques described above (e.g., which can help enforce slower speeds around landing zones or other areas where slower speeds are desirable).

Figure 8B:
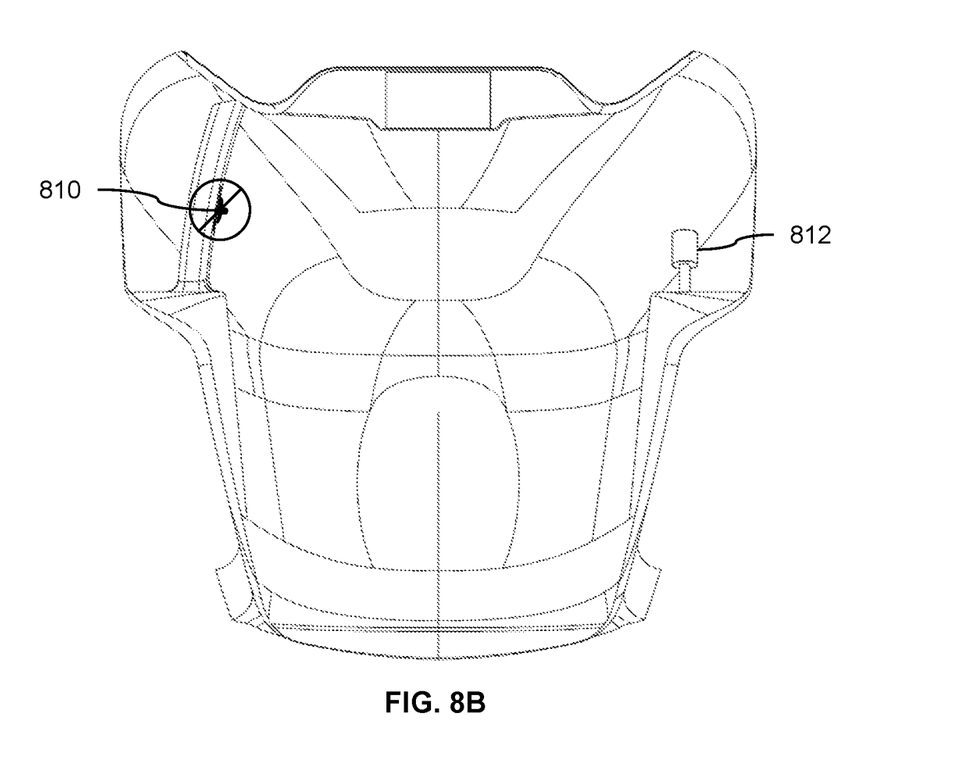
FIG. 8B is a diagram illustrating an embodiment of the cockpit of a single-seat multicopter.

FIG. 8B is a diagram illustrating an embodiment of the cockpit of a single-seat multicopter. FIG. 8B continues the example of FIG. 8A and shows a pilot's perspective of the cockpit, including the hand controls (or, more generally, input devices) which the pilot uses to fly the multicopter. In this example, the multicopter has hand controls (i.e., input devices): thumbwheel 810 and joystick 812.

Thumbwheel 810 is located on the left side of the cockpit and is used to control the multicopter's altitude (e.g., along the multicopter's vertical axis). The thumbwheel is a spring-centered thumbwheel. When no pressure is applied to the thumbwheel, the thumbwheel is pushed by internal springs into a centered position. In this centered position, the (e.g., current) altitude of the multicopter is maintained. If the thumbwheel is pushed up, the multicopter ascends (e.g., with the vertical speed proportional or otherwise dependent upon the amount or degree of displacement from center). If the thumbwheel is pushed down, the multicopter descends.

The joystick (812) is located on the right side of the cockpit and controls movement within a 2D plane (e.g., at a given altitude, within a 2D plane defined by the multicopter's lateral axis and longitudinal axis). The joystick is spring centered and goes into a centered position if no pressure is applied to the joystick. The multicopter moves in the direction indicated by the joystick's direction of displacement and at a speed that is proportional or otherwise dependent upon the amount or degree of displacement from center.

Initially, it was thought that pilots would want control over the aircraft's altitude (e.g., via thumbwheel 810) in addition to movement within a 2D plane (e.g., via joystick 812). However, feedback from and/or observations of pilots (and especially inexperienced pilots) during test flights indicated that altitude control is not necessary and/or always desired. For this reason, in some newer prototypes of the multicopter, there is no input device to control altitude (e.g., there is no up-down thumbwheel 810). Instead, the altitude is controlled autonomously or automatically (e.g., based on location and/or an autonomous flight process) or externally (e.g., by a controller on the ground). The following figures describe some examples of this.

Figure 9A:
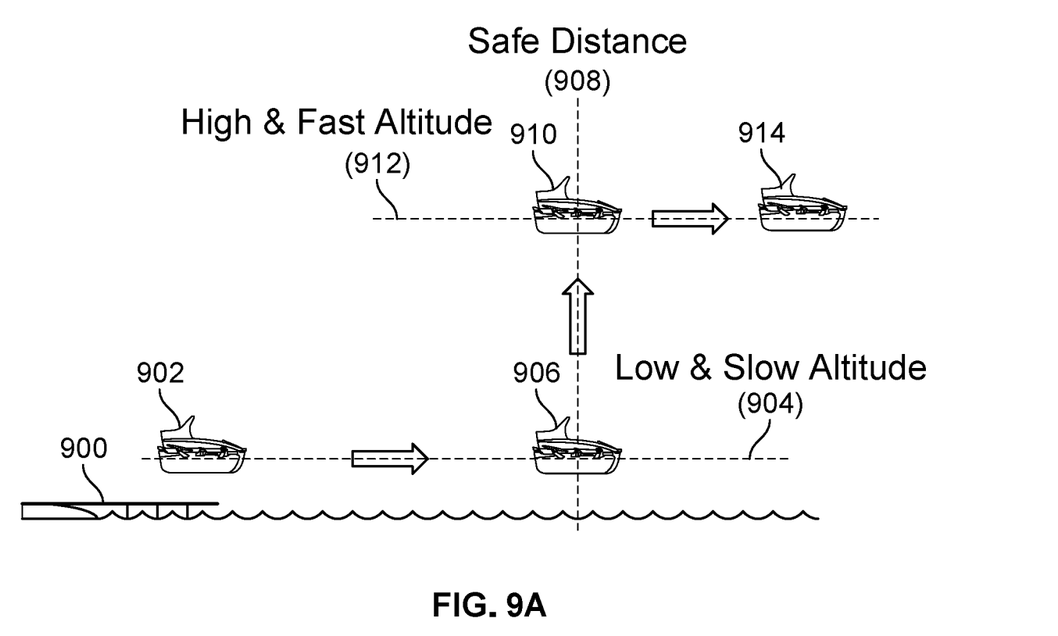
FIG. 9A is a diagram showing an embodiment of a multicopter without an input device for altitude control where the altitude is controlled by a supervisor at a base station.

FIG. 9A is a diagram showing an embodiment of a multicopter without an input device for altitude control where the altitude is controlled by a supervisor at a base station. In the example shown, a takeoff is being performed.

The multicopter at position 902 has just taken off from landing zone 900. The multicopter in this example is configured to ascend (e.g., automatically) to a low and slow altitude (904). For example, when the aircraft is still on landing zone 900, the pilot pushes the joystick (not shown) forwards to move the aircraft forwards. In response, the aircraft may fly forwards and automatically ascend to an altitude a few meters above the surface of the water, which is sufficiently high so that any variation in the altitude of the multicopter (e.g., due to noise or imprecision in the altitude controller) will not cause the multicopter to inadvertently dip into the water. Meanwhile, lateral (e.g., side to side) and forward-back movement are controlled by the pilot via the joystick in this region. For example, the pilot may guide the multicopter from position 902 (e.g., near landing zone 900) to position 906 (e.g., at safe distance 908 which is some horizontal distance from the landing zone (900)). With respect to FIG. 2, safe distance 908 in this figure may correspond to circle 202 in FIG. 2.

Once the pilot has flown the multicopter to safe distance 908, the multicopter is brought to a stop, hovering mid-air (see, e.g., multicopter 906). For example, the pilot may have been instructed (e.g., by the controller at a base station, not shown, via radio) to bring the multicopter to a mid-air (e.g., hovering) stop. Or, during some orientation session, the pilot may have been instructed to bring the aircraft out to some marker or buoy and then stop. In this example, once the multicopter is at a stop at safe distance 908, the controller at the base station (not shown) sends a signal to the multicopter so that the multicopter begins ascending to a high and fast altitude 912 (e.g., an altitude where it is safe for the pilot to fly at fast(er) speeds). In some embodiments, this signal also causes the multicopter to switch from a first sensitivity level (e.g., at step 100 in FIG. 1) to a second sensitivity level (e.g., at step 102 in FIG. 1).

When the multicopter is at position 910, the multicopter is correspondingly at the high and fast altitude (912). Subsequently, the multicopter will remain at that altitude (i.e., the high and fast altitude) while permitting the pilot to control movement within the 2D plane (e.g., forward and back, side to side, rotating about a vertical axis, etc.). For example, the pilot may use the joystick to fly forwards from multicopter position 910 to multicopter position 914 further away from the landing zone (e.g., with the altitude at a fixed altitude that is not controllable by the pilot).

To land, the reverse sequence would be performed. For example, the multicopter would be flown in by the pilot to approximately the safe distance (908) at the high and fast altitude (912) and brought to a mid-air, hovering stop. The controller or supervisor at the base station would then initiate the descent to the low and slow altitude (904). The pilot would then fly (e.g., at slower speeds per the first sensitivity level which applies closer to the landing zone) to the landing zone at the low and slow altitude (904).

In some embodiments, an automated flight process is used at or near a landing zone (or any other first region of interest). The following figure describes an example of this.

Figure 9B:
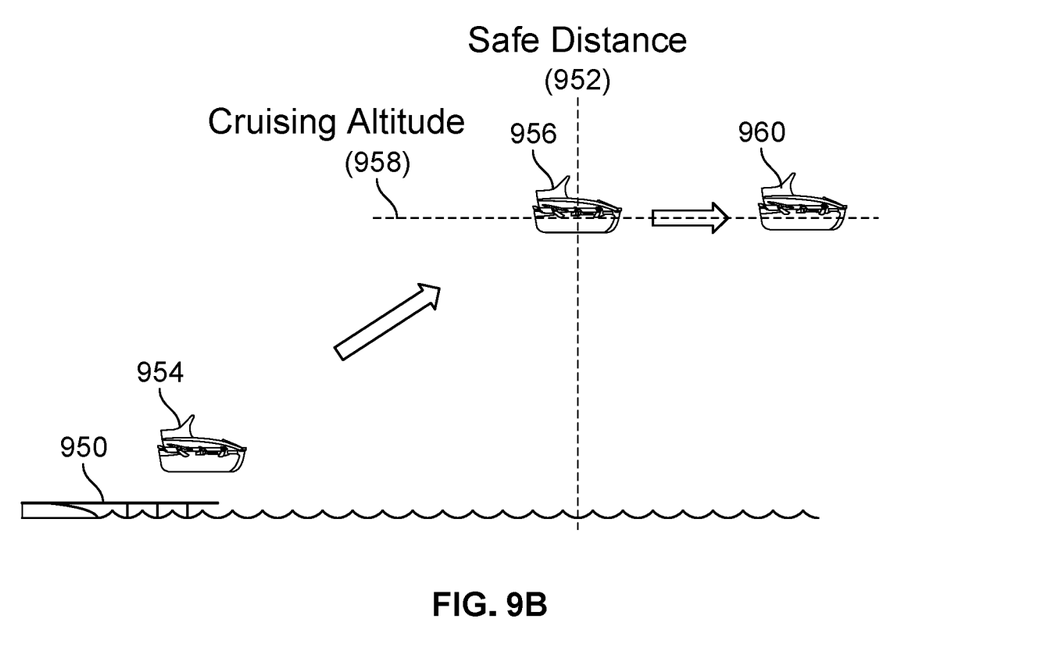
FIG. 9B is a diagram showing an embodiment of a multicopter without an input device for altitude control where the altitude is controlled by an autonomous flight process.

FIG. 9B is a diagram showing an embodiment of a multicopter without an input device for altitude control where the altitude is controlled by an autonomous flight process. In this example, an automated takeoff process controls the flight of the multicopter when the multicopter is relatively close to the landing zone (950), for example at distances less than safe distance 952. Since an automated takeoff process is already controlling the multicopter, the automated takeoff process is tasked with (also) controlling altitude.

Initially, the multicopter is on landing zone 950 when the automated takeoff process begins. In this example, the automated takeoff process flies the multicopter forward and upward to position 954. The automated takeoff process continues this upward and forward flight path until the multicopter reaches position 956, which is at a safe distance (952) from the landing zone (950) and at a cruising altitude (958). In this example, the automated takeoff process brings the multicopter to a hovering mid-air stop at position 956 so that the multicopter can switch over to a guided flight mode where the pilot controls the movement of the aircraft (e.g., but not the altitude, as that will remain fixed at cruising altitude 958 until the pilot returns for a landing). For example, a display screen or speaker in the multicopter may inform the pilot that the automated takeoff process has ended and/or that the pilot can begin flying the aircraft.

At stopped position 956, the aircraft also switches over from the first sensitivity level associated with the first region (e.g., where the input signal from the joystick is ignored) to the second sensitivity level associated with the second region (e.g., where the aircraft is responsive and/or sensitive to the input signal from the joystick). For example, the pilot may guide or fly the multicopter from position 956 to position 960, which is enabled or otherwise permitted by the aircraft since the second sensitivity level is used to interpret the input signal from the joystick (e.g., whereas the first sensitivity level in this example would cause the input signal from the joystick to be ignored). Until the pilot wishes to land, the pilot will be able to control the movement of the multicopter except for the altitude which will remain at the cruising altitude (958). To land, the reverse sequence occurs.

The following figure describes the above examples more generally and/or formally in a flowchart.

Figure 10:
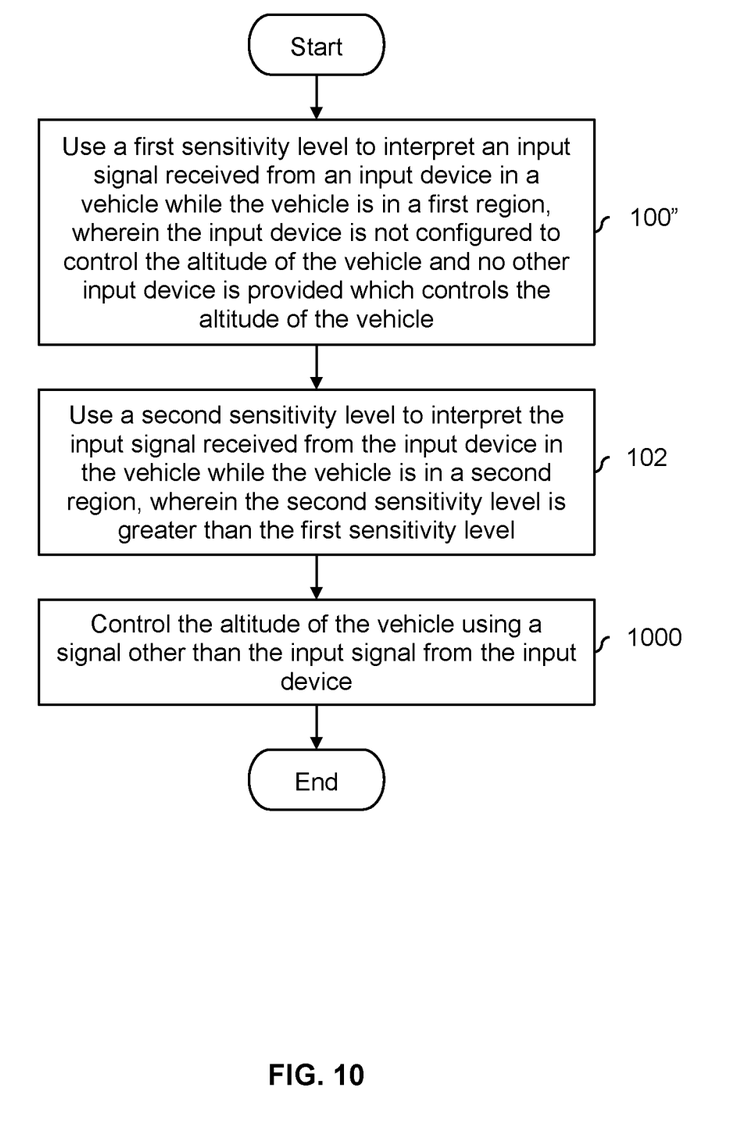
FIG. 10 is a flowchart illustrating an embodiment of a process to use different sensitivity levels to interpret an input signal received from an input device in a vehicle where there is no input device for altitude control.

FIG. 10 is a flowchart illustrating an embodiment of a process to use different sensitivity levels to interpret an input signal received from an input device in a vehicle where there is no input device for altitude control. FIG. 10 is related to FIG. 1 and the same or similar reference numbers are used to indicate the related steps.

At 100", a first sensitivity level is used to interpret an input signal received from an input device in a vehicle while the vehicle is in a first region, wherein the input device is not configured to control the altitude of the vehicle and no other input device is provided which controls the altitude of the vehicle. See, for example, the cockpit interior shown in FIG. 8B. To make it easier for inexperienced pilots to fly the multicopter shown in FIG. 8A and FIG. 8B, up-down thumbwheel 810 (e.g., which is used to control altitude) is removed in some versions or prototypes so that the pilots have fewer things to think and/or worry about. Instead, the pilots will only have joystick 812.

At 102, a second sensitivity level is used to interpret the input signal received from the input device in the vehicle while the vehicle is in a second region, wherein the second sensitivity level is greater than the first sensitivity level. For example, in FIG. 9A, the second region corresponds to the region beyond safe distance 908 with respect to landing zone 900 (i.e., the second region is to the right of line 908). Similarly, in the example of FIG. 9B, the second region corresponds to the region beyond safe distance 952 (i.e., the second region is to the right of line 952).

At 1000, the altitude of the vehicle is controlled using a signal other than the input signal from the input device. For example, in FIG. 9A, between multicopter positions 902 and 906 and between multicopter positions 910 and 914, the multicopter is held fixed at a low and slow altitude (904) and high and fast altitude (912), respectively. Between multicopter positions 906 and 910 (e.g., when the multicopter ascends and the altitude increases), that change is triggered by a signal from a supervisor or controller at a base station (not shown); the actual ascent may be controlled by an automated flight process.

In FIG. 9B, the ascent of the multicopter between multicopter positions 954 and 956 (i.e., when the altitude of the multicopter increases) is managed by the automated takeoff process. Between multicopter positions 956 and 960, the altitude is held fixed at cruising altitude 958.

In some embodiments, the processes of FIG. 4 and FIG. 10 are combined. For example, in addition to triggering the switch between using the first sensitivity level and using the second sensitivity level, receipt of the signal also triggers a change in the altitude of the vehicle (e.g., either an ascend or a descent). At other times, the altitude may be kept fixed. See, for example, FIG. 9A. For brevity, this specific combination is not shown in its own figure herein.

In some embodiments, the processes of FIG. 7 and FIG. 10 are combined. For example, the autonomous process used at step 100' to guide the vehicle (e.g., an autonomous takeoff process or an autonomous landing process) is also used to change the altitude of the vehicle (e.g., either an ascent or a descent). See, for example, FIG. 9B where the exemplary autonomous takeoff process also increases the altitude as the multicopter moves away from the landing zone. For brevity, this specific combination is not shown in its own figure herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
use a first sensitivity level to interpret an input signal received from an input device in a vehicle while the vehicle is in a first region; and
use a second sensitivity level to interpret the input signal received from the input device in the vehicle while the vehicle is in a second region, wherein the second sensitivity level is greater than the first sensitivity level, and wherein the first sensitivity level is at a sensitivity level where the input signal received from the input device is ignored and at least some of the time when the input signal received from the input device is ignored, an autonomous process is used to guide the vehicle.

2. The system recited in claim 1, wherein the memory is further configured to provide the is processor with instructions which when executed cause the processor to receive a signal associated with switching between the first sensitivity level and the second sensitivity level, wherein in response to receiving the signal, a switch between using the first sensitivity level and using the second sensitivity level is performed.

3. The system recited in claim 1, wherein the memory is further configured to provide the processor with instructions which when executed cause the processor to:
obtain a current location of the vehicle; and
determine whether the vehicle is in the first region or the second region based at least in part on the current location of the vehicle, wherein:
in response to determining that the vehicle is in the first region, the first sensitivity level is used; and
in response to determining that the vehicle is in the second region, the second sensitivity level is used.

4. The system recited in claim 1, wherein:
the memory is further configured to provide the processor with instructions which when executed cause the processor to receive a signal associated with switching between the first sensitivity level and the second sensitivity level, wherein in response to receiving the signal, a switch between using the first sensitivity level and using the second sensitivity level is performed.

5. The system recited in claim 1, wherein:
the memory is further configured to provide the processor with instructions which when executed cause the processor to:
obtain a current location of the vehicle; and
determine whether the vehicle is in the first region or the second region based at least in part on the current location of the vehicle, wherein:
in response to determining that the vehicle is in the first region, the first sensitivity level is used; and
in response to determining that the vehicle is in the second region, the second sensitivity level is used.

6. The system recited in claim 1, wherein:
the input device is not configured to control the altitude of the vehicle and no other input device is provided which controls the altitude of the vehicle; and
the memory is further configured to provide the processor with instructions which when executed cause the processor to control the altitude of the vehicle using a signal other than the input signal from the input device.

7. The system recited in claim 1, wherein:
the input device is not configured to control the altitude of the vehicle and no other input device is provided which controls the altitude of the vehicle; and
the memory is further configured to provide the processor with instructions which when executed cause the processor to:
receive a signal associated with switching between the first sensitivity level and the second sensitivity level, wherein in response to receiving the signal, a switch between using the first sensitivity level and using the second sensitivity level is performed; and
control the altitude of the vehicle using a signal other than the input signal from the input device, including by, in response to receiving the signal, changing the altitude of the vehicle.

8. The system recited in claim 1, wherein:
the input device is not configured to control the altitude of the vehicle and no other input device is provided which controls the altitude of the vehicle; and
the memory is further configured to provide the processor with instructions which when executed cause the processor to control the altitude of the vehicle using a signal other than the input signal from the input device, including by changing the altitude of the vehicle using the autonomous process.

9. A method, comprising:
using a first sensitivity level to interpret an input signal received from an input device in a vehicle while the vehicle is in a first region; and
using a second sensitivity level to interpret the input signal received from the input device is in the vehicle while the vehicle is in a second region, wherein the second sensitivity level is greater than the first sensitivity level, and wherein the first sensitivity level is at a sensitivity level where the input signal received from the input device is ignored and at least some of the time when the input signal received from the input device is ignored, an autonomous process is used to guide the vehicle.

10. The method recited in claim 9 further comprising receiving a signal associated with switching between the first sensitivity level and the second sensitivity level, wherein in response to receiving the signal, a switch between using the first sensitivity level and using the second sensitivity level is performed.

11. The method recited in claim 9 further comprising:
obtaining a current location of the vehicle; and
determining whether the vehicle is in the first region or the second region based at least in part on the current location of the vehicle, wherein:
   in response to determining that the vehicle is in the first region, the first sensitivity level is used; and
   in response to determining that the vehicle is in the second region, the second sensitivity level is used.

12. The method recited in claim 9, wherein:
the method further includes receiving a signal associated with switching between the first sensitivity level and the second sensitivity level, wherein in response to receiving the signal, a switch between using the first sensitivity level and using the second sensitivity level is performed.

13. The method recited in claim 9, wherein:
the method further includes:
   obtaining a current location of the vehicle; and
   determining whether the vehicle is in the first region or the second region based at least in part on the current location of the vehicle, wherein:
      in response to determining that the vehicle is in the first region, the first sensitivity level is used; and
      in response to determining that the vehicle is in the second region, the second sensitivity level is used.

14. The method recited in claim 9, wherein:
the input device is not configured to control the altitude of the vehicle and no other input device is provided which controls the altitude of the vehicle; and
the memory is further configured to provide a processor with instructions which when executed cause the processor to control the altitude of the vehicle using a signal other than the input signal from the input device.

15. The method recited in claim 9, wherein:
the input device is not configured to control the altitude of the vehicle and no other input device is provided which controls the altitude of the vehicle; and
the method further includes:
   receiving a signal associated with switching between the first sensitivity level and the second sensitivity level, wherein in response to receiving the signal, a switch between using the first sensitivity level and using the second sensitivity level is performed; and
   controlling the altitude of the vehicle using a signal other than the input signal from the input device, including by, in response to receiving the signal, changing the altitude of the vehicle.

16. The method recited in claim 9, wherein:
the input device is not configured to control the altitude of the vehicle and no other input device is provided which controls the altitude of the vehicle; and
the method further includes controlling the altitude of the vehicle using a signal other than the input signal from the input device, including by changing the altitude of the vehicle using the autonomous process.

17. A computer program product, the computer program product being embodied in a non-transitory computer readable storage medium and comprising computer instructions for:
   using a first sensitivity level to interpret an input signal received from an input device in a vehicle while the vehicle is in a first region; and
   using a second sensitivity level to interpret the input signal received from the input device is in the vehicle while the vehicle is in a second region, wherein the second sensitivity level is greater than the first sensitivity level, and wherein the first sensitivity level is at a sensitivity level where the input signal received from the input device is ignored and at least some of the time when the input signal received from the input device is ignored, an autonomous process is used to guide the vehicle.

* * * * *

UNITED STATES PATENT AND TRADEMARK OFFICE
CERTIFICATE OF CORRECTION

PATENT NO. : 11,550,318 B2
APPLICATION NO. : 17/208993
DATED : January 10, 2023
INVENTOR(S) : Mark Johnson Cutler, Alexander David Selwa and Todd Reichert It is certified that error appears in the above-identified patent and that said Letters Patent is hereby corrected as shown below:

On the Title Page
Primary Examiner, delete "Ian Jen" and insert --Mingjen Jen--, therefor.

In the Claims
Column 15, Line 9, Claim 10, after "claim 9", insert --,--.
Column 15, Line 9, Claim 10, after "comprising", insert --:--.
Column 15, Line 15, Claim 11, after "claim 9", insert --,--.

Signed and Sealed this
Third Day of September, 2024

Katherine Kelly Vidal
*Director of the United States Patent and Trademark Office*